J. CHARLTON.
Cultivator.
No. 28,833.
Patented June 26, 1860.
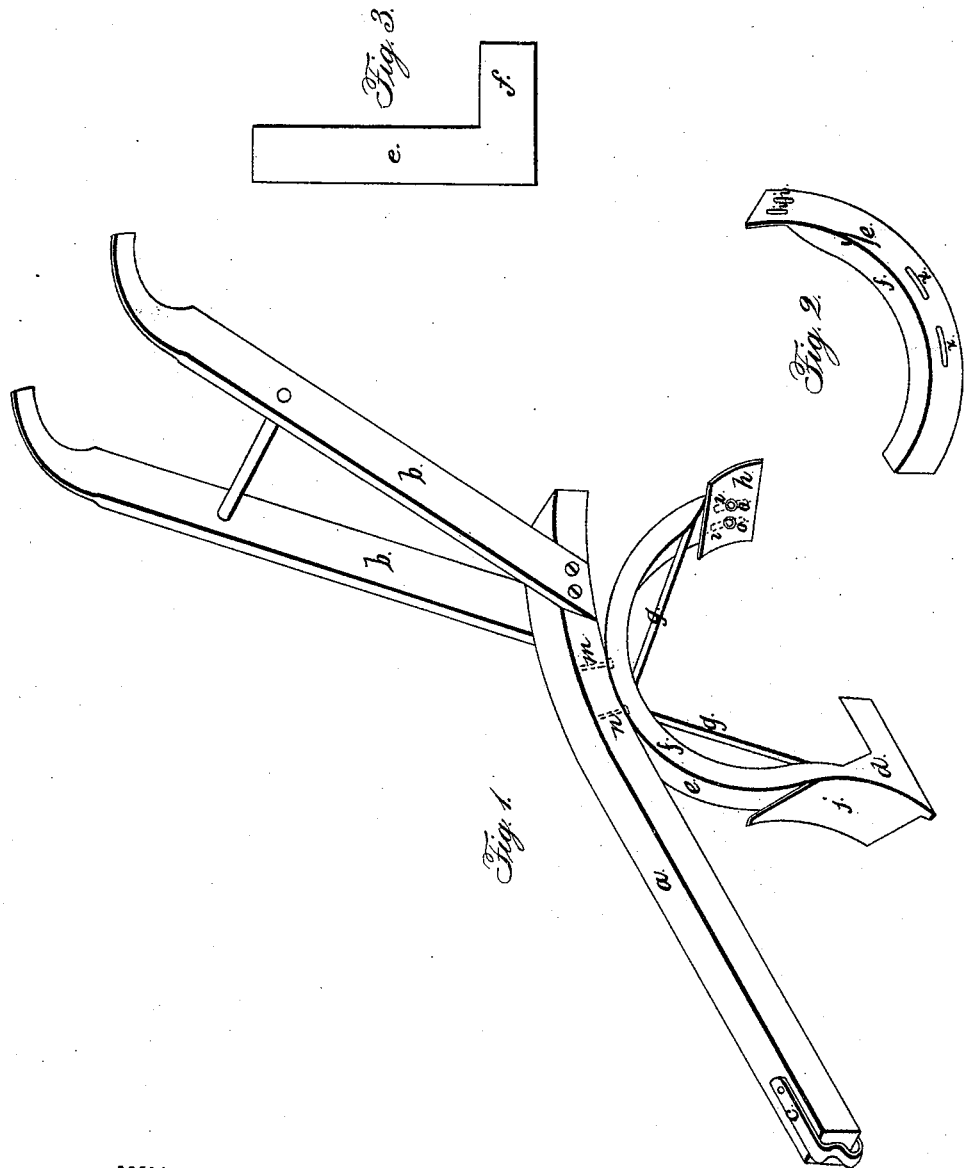
Witnesses:
James J. Johnston
James Miller
Inventor:
James Charlton

UNITED STATES PATENT OFFICE.

JAMES CHARLTON, OF ALLEGHENY, PENNSYLVANIA.

IMPROVEMENT IN CULTIVATORS.

Specification forming part of Letters Patent No. 28,833, dated June 26, 1860.

*To all whom it may concern:*

Be it known that I, JAMES CHARLTON, of Allegheny, in the county of Allegheny and State of Pennsylvania, have invented a new and Improved Cultivator; and I do hereby declare that the following is a full and exact description thereof, reference being had to the accompanying drawings, and to the letters of reference marked thereon.

The nature of my invention consists in placing a mold-board or bar-point and scraper on a flanged bar bent so as to form a segment of a circle, and furnished with slots for the purpose of adjusting the working of the mold-board or bar-point and scraper, and also for the purpose of changing the position of the scraper on the flanged bar, the whole being arranged, constructed, and operated in the manner hereinafter described.

To enable others skilled in the art to make and use my invention, I will proceed to describe its construction and operation.

In the accompanying drawings, Figure 1 is a perspective view of the cultivator. Fig. 2 is a sectional view of the flanged bar. Fig. 3 is a sectional view, representing a transverse cut of the flanged bar.

The beam $a$, handles $b$, and clevis $c$ are constructed in the usual manner.

The bar-point or mold-board $j$ and landside $d$ are made in one piece, and secured to the flanged bar $e$ by means of bolts or otherwise. The scraper $h$ is secured to and held in the desired position on the flanged bar $e$ by means of two bolts, $o$, which pass through the scraper $h$ and slots $i$.

By the arrangement of the slots $i$ in the flanged bar $e$ the scraper $h$ may be raised up or lowered down on the bar $e$; or it may be turned around so as to bring any one of its four edges next to the ground, and it may be placed at any angle desired without changing the position of the bar-point or mold-board $j$. The flanged bar $e$ is secured to the beam $a$ by means of two bolts, $n$, which pass through the slots $x$.

$g$ are braces used for the purpose of adding strength and stiffness to the bar $e$.

$f$ is the flange of the bar $e$, and is used for the purpose of making bar $e$ strong and firm.

By the arrangement of the slots $x$ in the flanged bar $e$ the bar-point or mold-board may be set to give any desired depth of furrow, and by the combination of the slots $x$ with the circular bend of the flanged bar $e$ the position of the bar-point or mold-board $j$ and the scraper $h$ can be changed at one operation by simply turning the flanged bar $e$.

The operation of my invention is as follows: Having all things constructed and arranged as represented in Fig. 1, the cultivator will be ready for use. When a deeper furrow is wanted, slacken the bolts $n$ and turn the flanged bar $e$ toward the front end of the beam $a$; and when a shallow furrow is desired, slacken the bolts $n$ and turn the flanged bar $e$ toward the back end of the beam $a$. After slackening the bolts and turning the flanged bar it should be secured again firmly to the beam $a$.

When any change is desired in the position of the scraper $h$, slacken the bolts $o$ and turn the scraper until the desired position is obtained; then secure it firmly to the flanged bar $e$ by means of the bolts.

Having thus described the nature, construction, and operation of my improvement, what I claim as of my invention, and desire to secure by Letters Patent of the United States, is—

The arrangement of the flanged bar $e$, bent so as to form the segment of a circle, and furnished with slots $x$ and $i$, the bar-point or mold-board and scraper being attached to said flanged bar, arranged, constructed, and operated as herein described, and for the purpose set forth.

JAMES CHARLTON.

Witnesses:
JAMES J. JOHNSTON,
JAMES MILLER.